United States Patent [19]

Teramachi

[11] Patent Number: 4,555,149
[45] Date of Patent: Nov. 26, 1985

[54] LINEAR SLIDE BEARING AND LINEAR SLIDE TABLE USING THIS BEARING

[76] Inventor: Hiroshi Teramachi, 34-8, Higashi-Tamagawa 2-chome, Setagaya-ku, Tokyo 158, Japan

[21] Appl. No.: 528,588

[22] Filed: Sep. 1, 1983

[30] Foreign Application Priority Data

Sep. 20, 1982 [JP] Japan .................................. 57-162113

[51] Int. Cl.[4] ............................................. F16C 29/06
[52] U.S. Cl. ...................................................... 308/6 C
[58] Field of Search .............. 308/3 R, 3 A, 6 R, 6 A, 308/6 B, 6 C

[56] References Cited

U.S. PATENT DOCUMENTS

| | | | |
|---|---|---|---|
| 3,721,478 | 3/1973 | Anderson et al. | 308/6 C |
| 4,273,389 | 6/1981 | Takai | 308/6 C |
| 4,296,974 | 10/1981 | Teramachi | 308/6 C |

*Primary Examiner*—Stuart S. Levy
*Assistant Examiner*—David Werner
*Attorney, Agent, or Firm*—Armstrong, Nikaido, Marmelstein & Kubovcik

[57] ABSTRACT

A linear slide bearing is disclosed having a slide block of substantially C-shaped cross section having a downwardly opened recess defined between arms thereof, one of the arms having an upwardly inclined surface on the inner side thereof, the other arm having a downwardly inclined surface on the inner side thereof, the upwardly and downwardly inclined surfaces each having a load ball groove semicircular in cross section, each of the arms further having a no-load ball hole bored therethrough; a pair of side covers attached to right and left side surfaces of the slide block, each side cover having guide grooves each interconnecting both end portions of the load ball groove and the no-load ball hole; a ball retainer formed from a thin plate material into a shape substantially conforming to the recess of the slide block, the ball retainer being mounted in the recess of the slide block, with both end portions thereof secured by the pair of side covers respectively; a large number of balls running through endless tracks formed by the load ball grooves and the no-load ball holes formed in the arms of the slide block; and a guide rail having at least the upper portion thereof formed into a shape substantially similar in cross section to that of the recess of the slide block.

14 Claims, 18 Drawing Figures

FIG. 9 　FIG. 10 　FIG. 11
FIG. 12
FIG. 13
FIG. 14
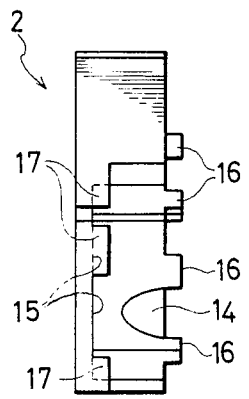
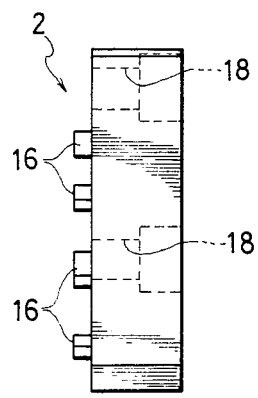
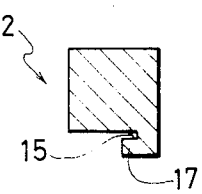
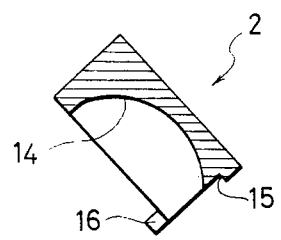
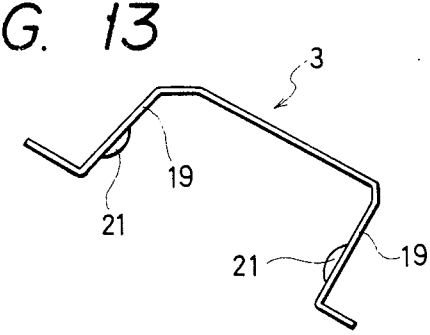
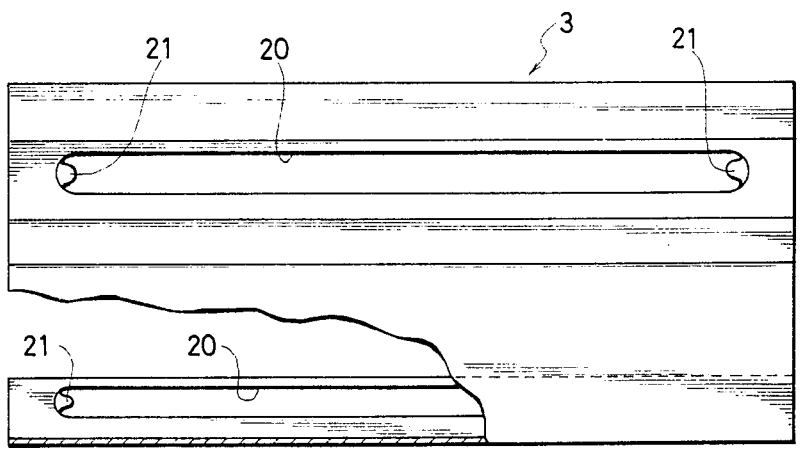

LINEAR SLIDE BEARING AND LINEAR SLIDE TABLE USING THIS BEARING

BACKGROUND OF THE INVENTION

The present invention relates to a linear slide bearing and a linear slide table using this bearing.

This kind of bearing and table is widely used on the sliding mechanism of industrial machines such as machining centers, X-, Y- and Z-axes of numerical controlled machine tools, automatic tool exchange equipment, automatic welding machines, injection molding machines and industrial robots.

The conventional bearings and tables of this kind, however, are constructed such that the guide rail has a pair of ball-rotating grooves formed on each shoulder thereof and a row of load-carrying balls are run through each ball-rotating groove so that the bearing can hold the shoulders of the guide rail (the specification of the U.S. Pat. No. 3,897,982). Therefore, four grooves must be cut in each guide rail and it is also necessary to form an endless track for each ball-rotating groove, which in turn requires many machining processes.

SUMMARY OF THE INVENTION

The present invention has been accomplished to overcome various problems experienced with such conventional linear slide bearings. More particularly, the invention relates to improvements in the invention previously proposed by the inventor and stated in Japanese Patent application No. 57-49170.

That is, the primary object of the invention is to provide a linear slide bearing which comprises: a slide block of substantially C-shaped cross section having a downwardly opened recess defined between arms thereof, one of the arms having an upwardly inclined surface on the inner side thereof, the other arm having a downwardly inclined surface on the inner side thereof, the upwardly and downwardly inclined surfaces each having a load ball groove semicircular in cross section, each of the arms further having a no-load ball hole bored therethrough; a pair of side covers attached to right and left side surfaces of the slide block, each side cover having guide grooves each interconnecting both end portions of the load ball groove and the no-load ball hole; a ball retainer formed from a thin plate material into a shape substantially conforming to the recess of the slide block, the ball retainer having a downwardly inclined surface and an upwardly inclined surface, facing the upwardly and downwardly inclined surfaces formed on both arms of the slide block, the downwardly and upwardly inclined surfaces having slots confronting their mating load ball grooves formed in the upwardly and downwardly inclined surfaces respectively, the ball retainer being mounted in the recess of the slide block, with both end portions thereof secured by the pair of side covers respectively; a large number of balls running through endless tracks formed by the load ball grooves and the no-load ball holes formed in the arms of the slide block and the guide grooves in the pair of side covers, the balls forming load-carrying ball trains running through the load ball grooves while partly projecting from the slots in the ball retainer and no-load ball trains running through the no-load ball holes; and a guide rail having at least the upper portion thereof formed into a shape substantially similar in cross section to that of the recess of the slide block, the guide rail further having a downwardly inclined surface and an upwardly inclined surface, facing the upwardly and downwardly inclined surfaces of the slide block respectively, the downwardly and upwardly inclined surfaces having ball-rotating grooves semicircular in cross section through which the balls forming the load-carrying ball trains run, whereby the linear slide bearing of the above construction can minimize the number of load ball grooves and ball-rotating grooves which require a troublesome grinding process and hence can be manufactured at low cost, and moreover, the balls are inserted into the endless tracks on the slide block side by means of the ball retainer, thereby facilitating the handling of the bearing and the mounting thereof onto a table or the like.

The second object of the invention is to provide a linear slide bearing wherein the ball retainer is mounted in the recess of the slide block by fitting both ends of the ball retainer into securing grooves provided on the respective side covers, thereby facilitating the mounting of the ball retainer as well as allowing the same to be reliably mounted.

The third object of the invention is to provide a linear slide bearing wherein each side cover has on its inner side a positioning projection adapted to be fitted into and retained by the recess on the underside of the slide block, thereby making it possible to mount the side covers on both sides of the slide block while accurately positioning the side covers, as well as eliminating the possibility of any displacement of the side covers after mounting.

The fourth object of the invention is to provide a linear slide bearing wherein tongues for scooping the balls forming the load-carrying ball trains are provided on both end portions of each slot in the ball retainer, thereby smoothing the recirculation of the balls through the endless tracks.

The fifth object of the invention is to provide a linear slide table having the above bearing incorporated therein, and a table structure which can easily apply a preload to the bearing.

BRIEF DESCRIPTION OF THE DRAWINGS

FIG. 9 is a rear view of the side cover shown in FIG. 8;

FIG. 10 is a front view of the side cover shown in FIG. 8;

FIG. 11 is a sectional view taken along the line XI—XI of FIG. 8;

FIG. 12 is a sectional view taken along the line XII—XII of FIG. 8;

FIG. 13 is an end view of the ball retainer;

FIG. 14 is a partly-cutaway plan view of the ball retainer shown in FIG. 13;

DESCRIPTION OF THE PREFERRED EMBODIMENTS

Figure 1:
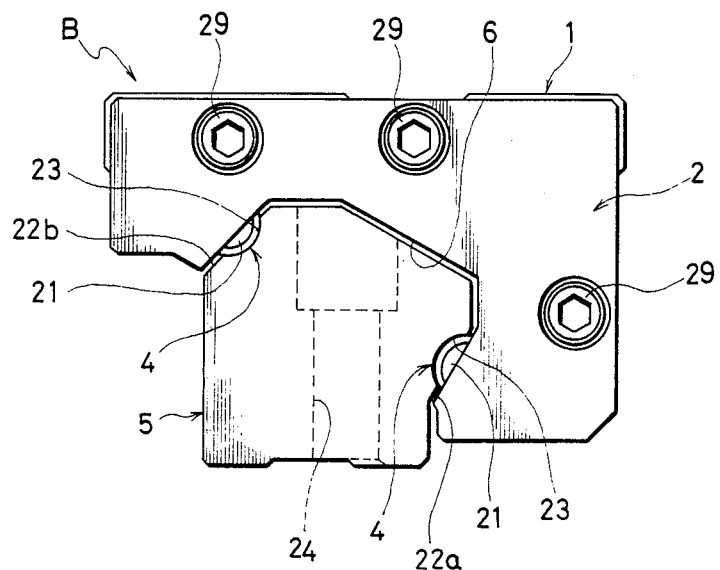
FIG. 1 is a side view of the first embodiment of the linear slide bearing in accordance with the invention.

The linear slide bearing and the linear slide table using this bearing in accordance with the invention will be described hereinunder with reference to the accompanying drawings.

FIGS. 1 through 5 show the first embodiment of the linear slide bearing B in accordance with the invention. The slide bearing B consists of: a slide block 1 formed to have a substantially C-shaped cross section and having a recess 6 which is obliquely downwardly opened; a pair of side covers 2 formed in cross section into a shape substantially similar to the profile of the slide block 1 and attached to right and left side surfaces of the slide block 1; a ball retainer 3 formed from a thin plate material into a shape substantially conforming to the recess 6 of the slide block 1 and mounted in the recess 6; a large number of balls 4; and a guide rail 5 having at least its upper portion formed in cross section into a shape substantially similar to that of the recess 6 of the slide block 1.

Figure 2:
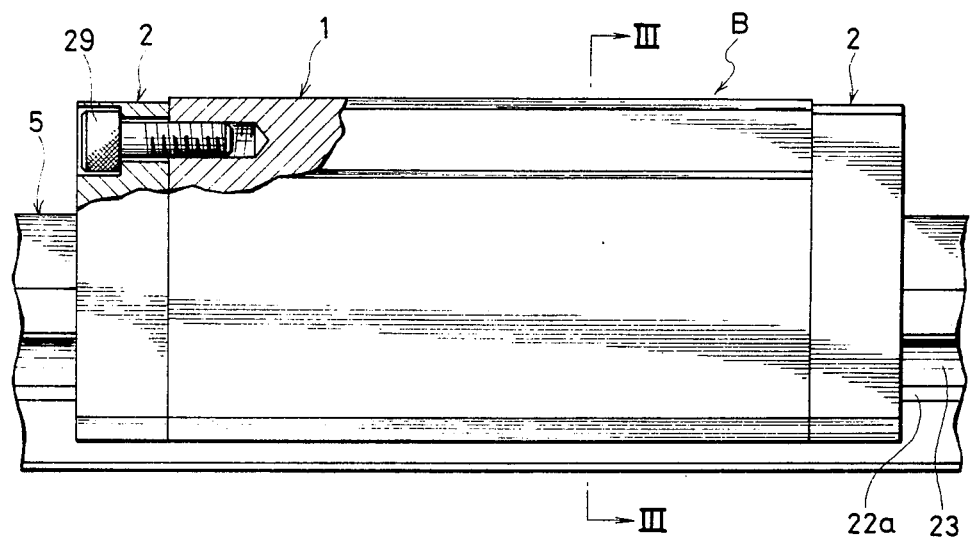
FIG. 2 is a front view of the linear slide bearing shown in FIG. 1.
Figure 3:
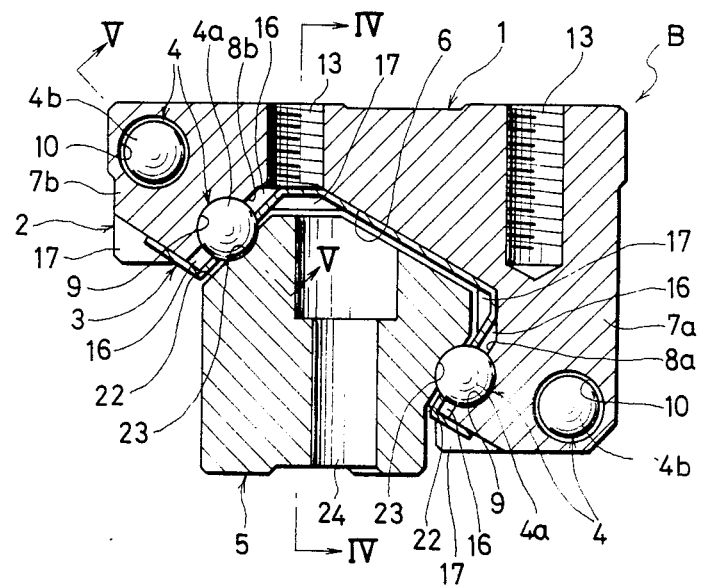
FIG. 3 is a sectional view taken along the line III—III of FIG. 2.
Figure 4:
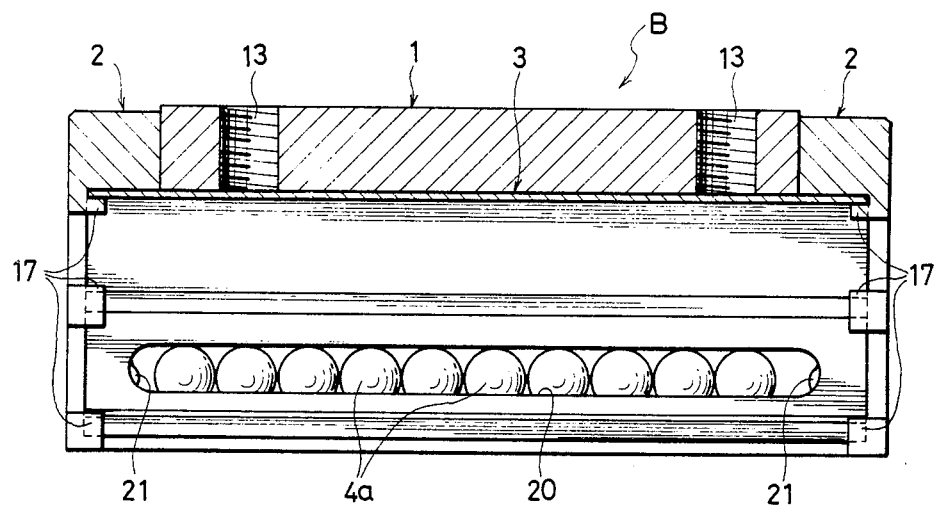
FIG. 4 is a sectional view taken along the line IV—IV of FIG. 3 with the guide rail omitted.
Figure 6:
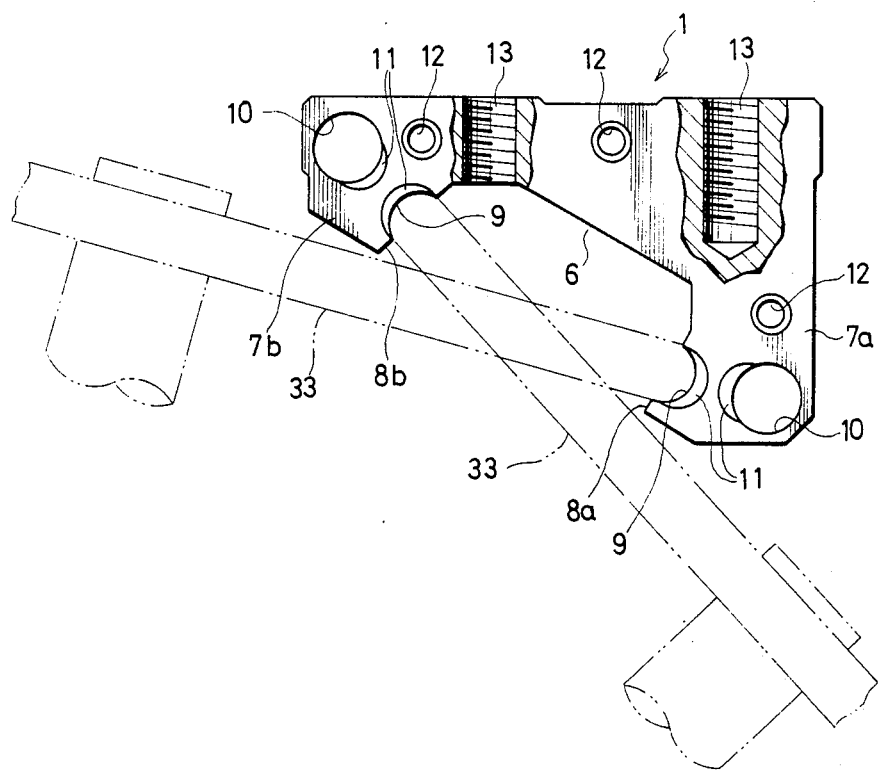
FIG. 6 is a partly-sectioned side view of the slide block.
Figure 7:
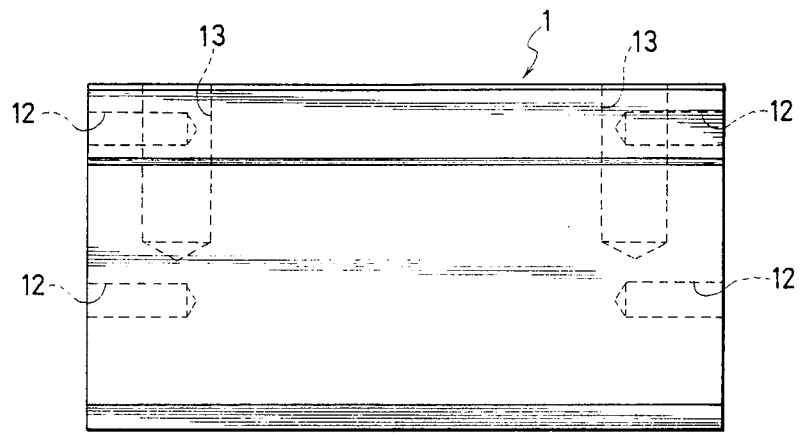
FIG. 7 is a front view of the slide block shown in FIG. 6.
Figure 17:
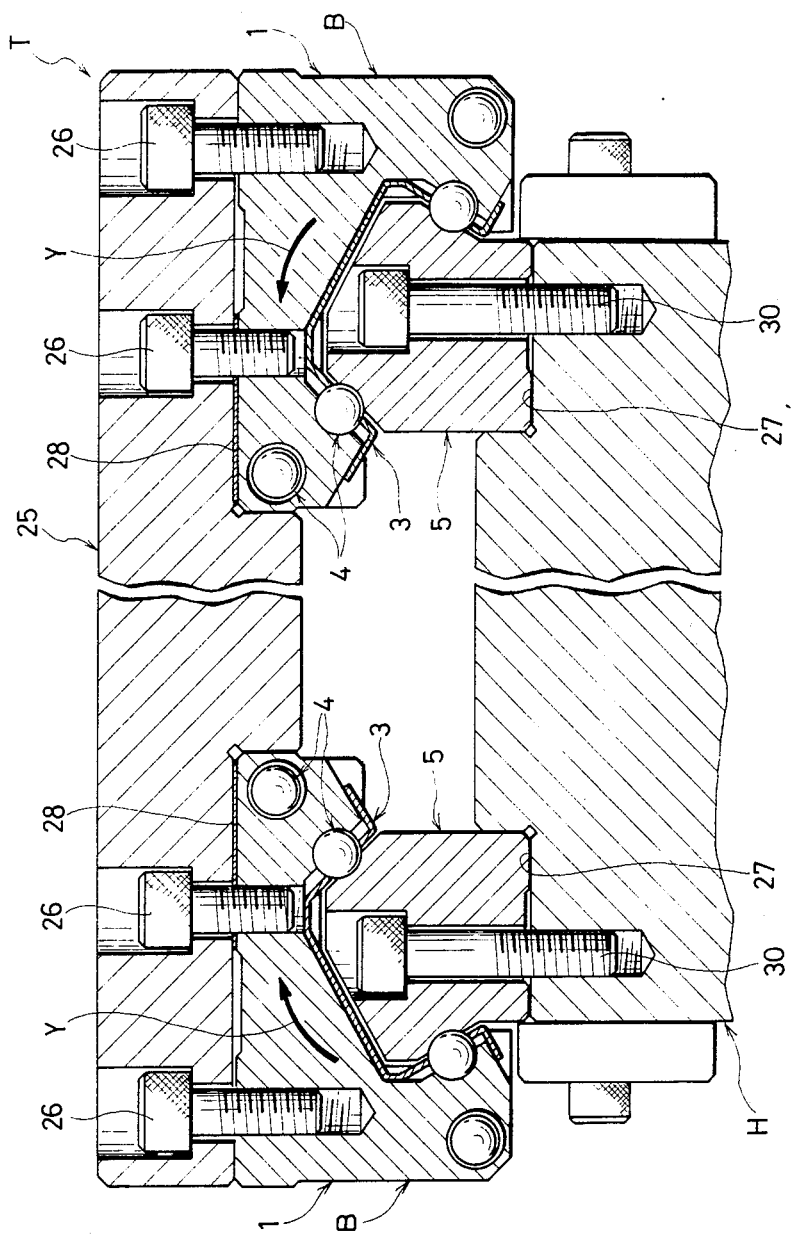
FIG. 17 is a sectional view of the linear slide table according to the second and third aspects of the invention.
Figure 18:
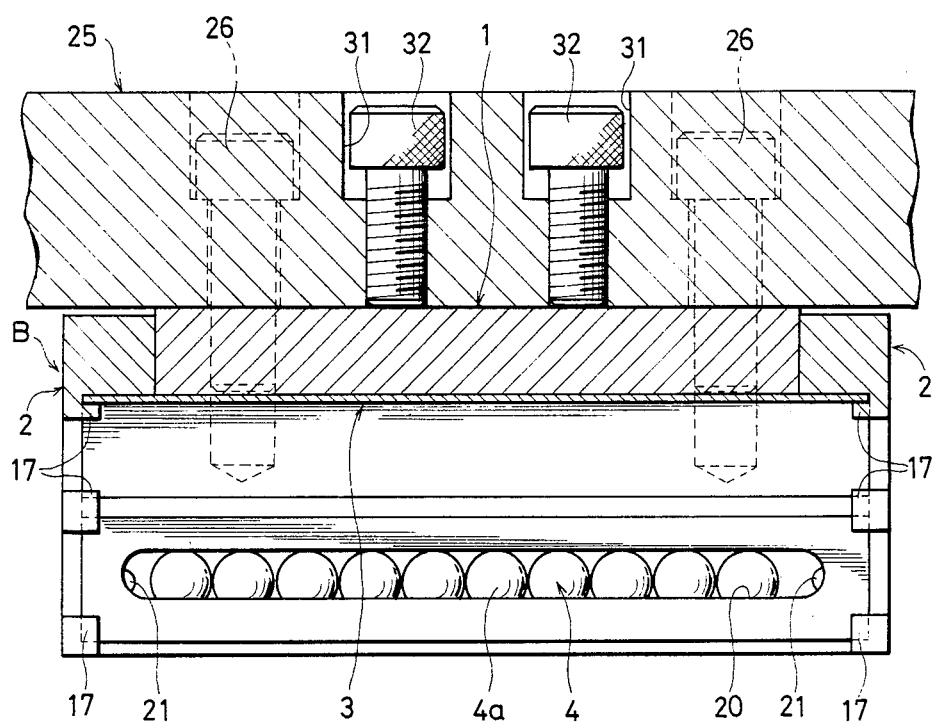
FIG. 18 is a sectional view showing another example of use of the bearing or table.

The slide block 1 is formed from a hardenable steel stock having rigidity. As shown in FIGS. 6 and 7, the recess 6 is formed so as to expand toward its obliquely downward opening direction. One 7a of the arms defining the recess 6 has an upwardly inclined surface 8a formed on its inner side lower portion, while the other arm 7b has a downwardly inclined surface 8b formed on its inner side. The arm 7a has formed in its upwardly inclined surface 8a a load ball groove 9 semicircular in cross section longitudinally extending over the entire length of the slide block 1, and is provided with a no-load ball hole 10 bored longitudinally of the arm 7a at the position adjacent to the load ball groove 9. Both end portions of these load ball groove 9 and no-load ball hole 10 have rounded portions 11 toward each other, thereby enabling the balls 4 to smoothly move between the load ball groove 9 and the no-load ball hole 10. Similarly to the arm 7a, the arm 7b has formed in its downwardly inclined surface 8b a load ball groove 9 semicircular in cross section longitudinally extending over the entire length of the slide block, and is provided with a non-load ball hole 10 bored longitudinally of the arm 7b at the position adjacent to the load ball groove 9. In addition, both end portions of these load ball groove 9 and the no-load ball hole 10 have rounded portions 11 formed toward each other. It is to be noted that, in the drawings, a reference numeral 12 denotes each of side-cover mounting hole into which a hexagon socket bolt 29 as shown in FIGS. 1 and 2 is screwed when the side covers 2 are attached to the right and left side surfaces of the slide block 1. Moreover, a reference numeral 13 represents each of mounting holes into which a connecting bolt 26 is screwed when, for example, a mounting table 25 is mounted on the upper surface of the slide block 1 as shown in FIGS. 17 and 18.

Since the recess 6 is formed so as to expand obliquely downward, the slide block 1 can be readily formed by drawing or the like. In addition, as shown by imaginary lines in FIG. 6, it becomes possible to grind the load ball grooves 9 by employing large grindstones. In other words, the load ball groove 9 of arm 7b is positioned such that there is clear access thereto for grinding purposes, with respect to arm 7a from a direction generally perpendicular to a chord drawn across the edges of the load ball groove, as shown in FIG. 6 with the grinding wheels in phantom. The load ball groove 9 of arm 7a is positioned such that there is clear access thereto for grinding purposes, with respect the arm 7b. Accordingly, the load ball grooves 9 can be improved in accuracy, and it is also possible to improve the load ball grooves 9 in the machining efficiency.

On the other hand, the side cover 2 is formed of a hard synthetic resin having rigidity. As shown in FIGS. 8 through 12, the side cover 2 has guide grooves 14 substantially semicircular in cross section for interconnecting the end portions of the load ball grooves 9 and the no-load ball holes 10 formed in the arms 7a, 7b of the slide block 1 when the side cover 2 is attached to the side surface of the slide block 1 so that the balls 4 running through the load ball grooves 9 or the no-load ball holes 10 are changed in course by the guide grooves 14 and guided into the no-load ball holes 10 or the load ball grooves 9. Moreover, the side cover 2 has on its inner side a securing groove 15 having the same shape as the cross-sectional shape of the ball retainer 3 so that when the side covers 2 are attached to the right and left side surfaces of the slide block 1, both end portions of the ball retainer 3 are fitted in the securing grooves in the respective side covers 2, thereby to mount the ball retainer 3 in the recess 6 of the slide block 1. Further, the side cover 2 is provided with a pair of projections 16 projected from the inner side of the side cover 2 on both sides of each of the end portions of the securing groove 15 closer to the respective load ball grooves 9 so that when the side covers 2 are attached to the right and left side surfaces of the slide block 1, the projections 16 are fitted into and retained by the recess 6 of the slide block 1, thereby allowing the side covers 2 to be readily positioned.

Thus, the side covers 2 are attached to the right and left side surfaces of the slide block 1, while being positioned through the projections 16, and the ball retainer 3 is mounted by fitting both end portions thereof into the securing grooves 15 in the respective side covers 2. Therefore, the slide block 1, the side covers 2 and the ball retainer 3 are accurately positioned by means of the securing grooves 15 and the projections 16 of the side covers 2. This makes it possible to readily and accurately set the positional relationship among the load ball grooves 9, the no-load ball holes 10, the guide grooves 14 in the side covers 2 and the slots 20 in the ball retainer 3. Accordingly, the balls 4 can smoothly run, and in addition, the sliding resistance thereof and noises are reduced.

Figure 8:
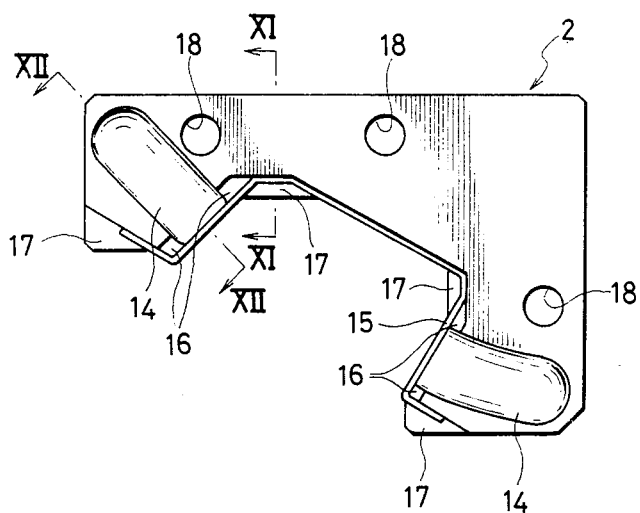
FIG. 8 is a side view showing the inner side of the side cover.

The securing groove 15 in the side cover 2, as shown in FIGS. 8, 9 and 11, has projections 17 for holding the end portions of the ball retainer 3 at its starting and terminating end portions and two corner portions in its intermediate part. The other portions of the securing groove 15 are formed into a step-like shape opened on one side thereof. It is to be noted that, in the drawings, a reference numeral 18 denotes each of receiving bores by which the above-mentioned hexagon socket bolt 29 is received when the side cover 2 is attached to the side surface of the slide block 1.

Figure 5:
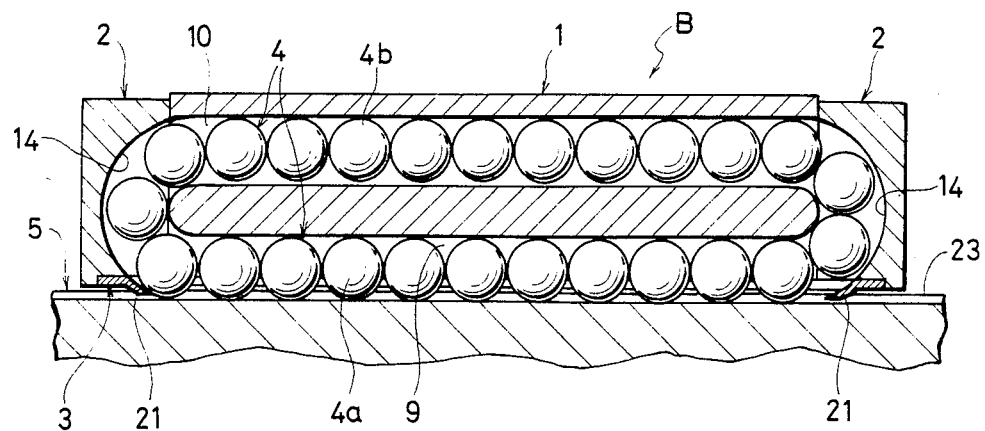
FIG. 5 is a sectional view taken along the line V—V of FIG. 3.

The ball retainer 3 mounted in the recess 6 of the slide block 1 by the pair of side covers 2 is formed by pressing a steel plate or the like having rigidity. As shown in FIGS. 13 and 14, the ball retainer 3 has slots 20 opened in inclined surfaces 19 facing the upwardly inclined surface 8a and the downwardly inclined surface 8b of the slide block 1, respectively. In addition, on both end portions of each slot 20, tongues 21 are formed projecting toward the surface. The slots 20 are formed in the ball retainer 3 so that, when it is mounted in the recess 6 of the slide block 1, as shown in FIG. 5, the slots 20 face their respective mating load ball grooves 9 formed in the slide block 1, and the balls running through the load ball grooves 9 are partly projected from the slots 20. Moreover, the tongues 21 are adapted to scoop the balls 4 running from the load ball grooves 9 to the corresponding no-load ball holes 10 and guide them from the guide grooves 14 in the side covers 2 into the no-load ball holes 10.

Endless tracks for the balls 4 are formed by the load ball grooves 9 and the no-load ball holes 10 formed in the respective arms 7a, 7b of the slide block 1, the guide grooves 14 formed in the pair of side covers 2 attached to the right and left side surfaces of the slide block 1, and the slots 20 in the ball retainer 3. A large number of balls 4 filled in the endless tracks form load-carrying ball trains 4a in the load ball grooves 9 and no-load ball trains 4b in the no-load ball holes 10.

Figure 15:
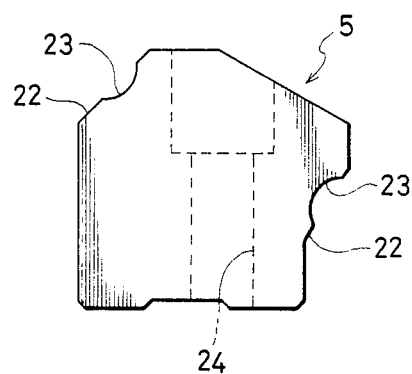
FIG. 15 is an end view of the guide rail.
Figure 16:
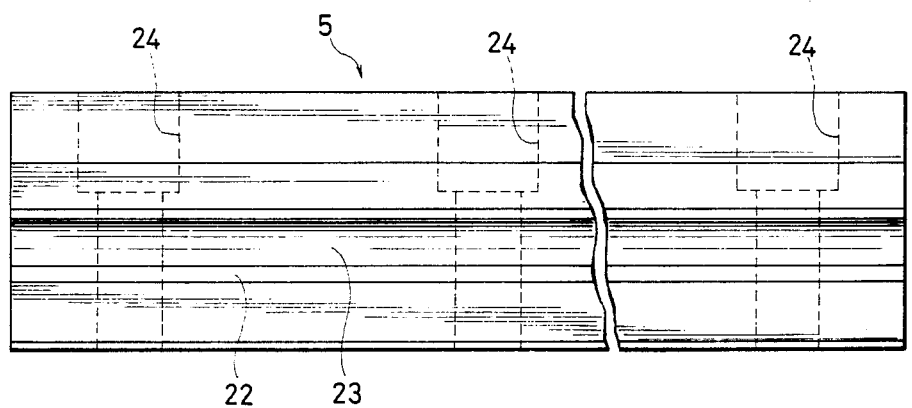
FIG. 16 is a front view of the guide rail shown in FIG. 15.

Moreover, the guide rail 5, as shown in FIGS. 15 and 16, has at least its upper part formed to have a cross-sectional shape substantially similar to the shape of the recess 6 of the slide block 1. The guide rail 5 has inclined surfaces 22 facing the upwardly inclined surface 7a and the downwardly inclined surface 7b of the slide block 1, respectively. The inclined surfaces 22 have ball-rotating grooves 23 semicircular in cross section which are similar to the load ball grooves 9 formed in the upwardly and downwardly inclined surfaces 7a, 7b so that the balls 4 forming the load-carrying ball trains 4a and partly projected from the slots 20 in the ball retainer 3 run in contact with these ball-rotating grooves 23. It is to be noted that, in the drawings, a reference numeral 24 denotes each of mounting bores for receiving fastening bolts 30 when the guide rail 5 of the bearing B is mounted on a machine body or a bed H having a mounting base surface 27 as shown in FIG. 17, for example.

FIG. 17 shows a linear slide table T constructed by incorporating therein the linear slide bearing B in accordance with the above-described embodiment. The table T consists of: a pair of bearings B in accordance with the above embodiment; a mounting table 25 secured at both ends to the upper surfaces of the slide blocks 1 of the respective bearings B; two pairs of connecting bolts 26 (a total of four bolts for one bearing B) used in pair and aligned widthwise on the upper surface of the slide block 1 of each bearing B; and a bed H having base surfaces 27 on which the guide rails 5 of the bearings B are mounted and secured.

In this embodiment, each bearing B is connected to the mounting table 25 so that the arm 7a having the upwardly inclined surface 8a of its slide block 1 is located outer than the other arm 7b. In addition, a shim 28 is inserted between that part of the slide block 1 of each bearing B corresponding to the arm 7b having the downwardly inclined surface 8b and the undersurface of the mounting table 25. By tightening the bolts 26, that part of each slide block 1 corresponding to the arm 7a having the upwardly inclined surface 8a is more tightened by the thickness of the inserted shim 28 so that the slide block 1 of each bearing B is urged to turn in the direction of arrow Y thereby to apply a preload to each bearing B.

Accordingly, in assembling the linear slide table T, first, the guide rails 5 of the respective bearings B are secured to the base surfaces 27 of the bed H by the bolts 30. Then, the slide blocks 1 of the bearings B are mounted on the guide rails 5, respectively; the mounting table 25 is installed on the upper surfaces of the slide blocks 1 of the bearings B; a shim 28 of appropriate thickness as detemined by the preload to be applied to each bearing B is inserted between the undersurface of the mounting table 25 and that part of the upper surface of each slide block 1 corresponding to the arm 7b having the downwardly inclined surface 8b; and then the bolts 26 are tightened to secure the mounting table 25 to the bearing B as well as give a predetermined amount of preload to each bearing B.

In the above embodiment, in applying preload to each bearing B the shim 28 is inserted between the undersurface of the mounting table 25 and the slide block 1 of each bearing B on the arm 7b having the downwardly inclined surface 8b. It is, however, also possible to give a preload to the bearing by placing a thick shim on the arm 7b having the downwardly inclined surface 8b and a thin shim on the arm 7a having the upwardly inclined surface 8a so that the preload is determined by the difference in thickness between the two shims.

Another means to apply preload to each bearing B is to form between the undersurface of the mounting table 22 and the upper surface of the slide block 1 of each bearing B, a gap which expands gradually from the end of the slide block on the side of the arm 7b having the downwardly inclined surface 8b toward the other end on the arm 7a having the upwardly inclined surface 8a, and then to fasten together the mounting table and the slide blocks by tightening the bolts 26. In forming the gap, it is desirable to make the undersurface of the mounting table 25 horizontal and the upper surface of the slide block 1 of each bearing B inclined.

Another example of using the linear slide bearing B and the linear slide table T using the same is as follows. As shown in FIG. 18, between the right and left bolts 26 connecting the mounting table 25 and the slide block 1 of each bearing B, pressing bolts 32 are provided which screw into through-holes 31 bored in the mounting table 25 as well as have their ends abutting against the upper surface of the slide block 1. After the mounting table 25 is mounted on the upper surfaces of the slide blocks 1 of the bearings B by the bolts 26, the pressing bolts 32 are tightened to make their ends press the upper surfaces of the slide blocks 1. Thus, the portions of each slide block 1 closer to both its ends are upwardly bent, and the gap between the load ball groove 9 formed in each of the arms 7a, 7b of the slide block 1 and the mating ball-rotating groove 23 on the guide rail 5 has such a shape that the portions closer to both its ends are expanded but its intermediate portion is contracted, thereby allowing the balls 4 to smoothly move in and out of the load-carrying regions in the endless tracks. As a result, the balls 4 can move smoothly, and it is also possible to improve the "crowning" effect that reduces the shock applied to each ball 4 when it moves from the no-load carrying region to the load-carrying region in the endless track.

The linear slide bearing of the invention constructed as described above has the following features and advantages.

Since it is possible to halve the number of load ball grooves and ball-rotating grooves formed in the slide block and the guide rail respectively which require a large number of machining processes for grinding and finishing grooves, the manufacture of the slide block and the guide rail becomes easier correspondingly, and the production cost can be largely reduced. Moreover, the ball retainer is mounted on the slide block so that the balls will not fall off; therefore, the assembly of the bearing becomes extremely easy, which also permits a reduction of the production cost. In addition, since it is possible to mount the slide block on the guide rail after inserting the balls into the slide block, a preload can be previously given to the assembled bearing by selecting slightly large balls as those to be inserted into the slide block. Thus, any gap is eliminated with respect to the rotational direction of the bearing, and it is possible to prevent any shaking of the bearing in sliding.

In addition, the slide block is formed to have a substantially L-shaped cross section by the recess opened obliquely downward. As a result, the slide block as a whole is greatly improved in rigidity, and it also becomes easy to grind the load ball groove formed in the upwardly inclined surface or the downwardly inclined surface of both arms of the slide block.

Moreover, since the ball retainer is formed from a thin plate material into a shape substantially conforming to the recess of the slide block and is mounted in the recess, grease pockets are defined between the slide block and the ball retainer to permit a large amount of grease to be injected. In addition, the load ball grooves on the slide block and the ball-rotating grooves on the guide rail become shallow, so that, in grinding these load ball grooves and ball-rotating grooves, the whole of each groove can be readily ground without strictly regulating the directional property of the grindstone. Accordingly, an excellent workability is obtained in grinding grooves. Moreover, also the guide rail can be easily manufactured by drawing or other means, and a wiper effect can be exerted to the grooves on the guide rail by providing a seal on the slide block.

In addition, the linear slide table in accordance with the invention is assembled by employing the above linear slide bearing and hence can be manufactured at low cost. Further, the table can easily apply a preload to each bearing by employing a simple means such as a shim or the like as well as readily regulate the preload.

What is claimed is:

1. A linear slide bearing comprising:
    a slide block of substantially C-shaped cross section having a obliquely downward opened recess defined between arms thereof, one of the arms having an upwardly facing inclined surface on the inner side thereof, the other arm having a downwardly facing inclined surface on the inner side thereof, the upwardly and downwardly facing inclined surfaces each having only a single load ball groove semicircular in cross section extending longitudinally thereon, the load ball groove in one of said arms being positioned such that there is clear access thereto, for grinding purposes, with respect to the other of said arms, from a direction generally perpendicular to a chord drawn across the edges of said load ball groove, and the load ball groove of the other of said arms being positioned such that there is clear access thereto, for grinding purposes, with respect to said one arm, and each of said arms further having no-load ball hole bored longitudinally therethrough;
    a pair of side covers attached to right and left side surfaces of said slide block, each side cover having guide grooves each interconnecting both end portions of the load ball groove and the no-load ball hole formed in each arm;
    a ball retainer formed from a thin plate material into a shape substantially conforming to the recess of said slide block, said ball retainer having a downwardly facing inclined surface and an upwardly facing inclined surface, facing the upwardly and downwardly facing inclined surfaces formed on both arms of said slide block respectively, said downwardly end upwardly facing inclined surfaces having slots confronting their mating load ball grooves formed in said upwardly and downwardly facing inclined surfaces respectively, said ball retainer being mounted in the recess of said slide block, with both end portions thereof secured by said pair of side covers respectively;
    a large number of balls running through endless tracks formed by the load ball grooves and the no-load ball holes formed in the arms of said slide block and the guide grooves in said pair of side covers interconnecting both end portions of these grooves and holes respectively, the balls forming load-carrying ball trains running through said load ball grooves while partly projecting from the slots in said ball retainer and no-load ball trains running through said no-load ball holes; and
    a guide rail having at least the upper portion thereof formed into a shape substantially similar in cross section to that of the recess of said slide block, said guide rail further having a downwardly facing inclined surface and an upwardly facing inclined surface, facing the upwardly and downwardly inclined surfaces of said slide block respectively, said downwardly and upwardly facing inclined surfaces having ball-rotating grooves semicircular in cross section through which the balls forming the load-carrying ball trains and partly projecting from the respective slots in said ball retainer run.

2. A linear slide bearing as defined in claim 1, wherein the recess of said slide block has a shape expanded obliquely downward.

3. A linear slide bearing as defined in claim 1, wherein each of said side covers has on its inner side a securing groove into which an end portion of said ball retainer is fitted.

4. A linear slide bearing as defined in either one of claims 1 and 3, wherein each of said side covers has on its inner side a positioning projection fitted in and received by said recess on the underside of said slide block.

5. A linear slide bearing as defined in claim 1, wherein said ball retainer has on both end portions of each slot thereof tongues for scooping the balls forming the load-carrying ball trains.

6. A linear slide table comprising: a slide block of substantially C-shaped cross section having an obliquely downward opened recess defined between arms thereof, one of the arms having an upwardly facing inclined surface on the inner side thereof, the other arm having a downwardly facing inclined surface on the inner side thereof, the upwardly and downwardly facing inclined surfaces each having a load ball groove semicircular in cross section extending longitudinally thereon, the load ball groove in one of said arms being positioned such that there is clear access thereto, for grinding purposes, with respect to the other of said arms, from a direction generally perpendicular to a chord drawn across the edges of said load ball groove, and the load ball groove of the other of said arms being positioned such that there is clear access thereto, for grinding purposes, with respect to said one arm, each of said arms further having a no-load ball hole bored longitudinally therethrough; a pair of side covers attached to right and left side surfaces of said slide block, each side cover having guide grooves each interconnecting both end portions of the load ball groove and the no-load ball hole firmed in each arm; a ball retainer formed from a thin plate material into a shape substantially conforming to the recess of said slide block, said ball retainer having a downwardly facing inclined surface and an upwardly facing inclined surface, facing the upwardly and downwardly facing inclined surfaces formed on both arms of said slide block respectively, said downwardly and upwardly facing inclined surfaces having slots confronting their mating load ball grooves formed in said upwardly and downwardly facing inclined surfaces respectively, said ball retainer being mounted in the recess of said slide block, with both end portions thereof secured by said pair of side covers respectively; a large number of balls running through endless tracks formed by the load ball grooves and the no-load ball holes formed in the arms of said slide block and the guide grooves in said pair of side covers interconnecting both end portions of these grooves and holes respectively, the balls forming load-carrying ball trains running through said load ball grooves while partly projecting from the slots in said ball retainer and no-load ball trains running through said no-load ball holes; a guide rail having at least the upper portion thereof formed into a shape substantially similar in cross section to that of the recess of said slide block, said guide rail further having a downwardly facing inclined surface and an upwardly facing inclined surface, facing the upwardly and downwardly facing inclined surfaces of said slide block respectively, said downwardly and upwardly facing inclined surfaces having ball-rotating grooves semicircular in cross section through which the balls forming the load-carrying ball trains and partly projecting from the respective slots in said ball retainer run; and a mounting table surface mounted on the upper surfaces of the slide blocks of the pair of bearings whose guide rails are secured to a mounting base surface.

7. A linear slide table as defined in claim 6, wherein the recess of the slide block of each bearing has a shape expanded obliquely downward.

8. A linear slide table as defined in claim 6, wherein each side cover of each bearing has on its inner side a securing groove into which an end portion of said ball retainer is fitted.

9. A linear slide table as defined in either one of claims 6 and 8, wherein each side cover of each bearing has on its inner side a positioning projection fitted into and retained by the recess on the underside of said slide block.

10. A linear slide table as defined in claim 6, wherein said ball retainer of each bearing has on both end portions of each slot thereof tongues for scooping the balls forming the load-carrying ball trains.

11. A linear slide table as defined in any one of claims 6 through 10, wherein said mounting table surface is secured to the upper surface of the slide block of each bearing by a connecting bolt, and a preload is applied to each bearing by tightening said connecting bolt.

12. A linear slide table as defined in claim 11, wherein the connecting bolts are used in pair for each bearing and aligned widthwise and a shim is inserted only between the undersurface of the mounting table surface and that part of the upper surface of each slide block on the side of the arm having the downwardly facing inclined surface to apply a preload to each bearing by tightening the connecting bolts.

13. A linear slide table as defined in claim 11, wherein the connecting bolts are used in pair for each bearing and aligned widthwise, and a thick shim is inserted between the undersurface of the mounting table surface and that part of the upper surface of the slide block on the side of the arm having the downwardly facing inclined surface and a thin shim is inserted between the undersurface of the mounting table surface and that part of the upper surface of the slide block on the side of the arm having the upwardly facing inclined surface so as to give a preload to each bearing by tightening the connecting bolts.

14. A linear slide table as defined in claim 11, wherein the connecting bolts are used in pair for each bearing and aligned widthwise and a gap is formed between the upper surface of each slide block and the undersurface of the mounting table surface, which gradually expands from the arm having the downwardly facing inclined surface toward the arm having the upwardly facing inclined surface, so as to apply a preload to each bearing by tightening the connecting bolts.

* * * * *